United States Patent
Farnam

[15] 3,668,036
[45] June 6, 1972

[54] METHOD FOR ATTACHING GASKET AND/OR INSULATOR MEMBERS TO PLATE STRUCTURES

[72] Inventor: Robert G. Farnam, New Lisbon, Wis.
[73] Assignee: F. D. Farnam Co.
[22] Filed: Jan. 26, 1970
[21] Appl. No.: 5,734

[52] U.S. Cl....................................156/252, 277/235 B
[51] Int. Cl.............................................B32b 31/20
[58] Field of Search...... 277/235 B; 156/292, 252, 289, 291; 118/504–505

[56] References Cited

UNITED STATES PATENTS

| | | | |
|---|---|---|---|
| 2,089,254 | 8/1937 | Fitzgerald | 277/235 B |
| 2,622,053 | 12/1952 | Clowe et al. | 156/290 X |
| 2,681,241 | 6/1954 | Aukers | 227/235 B |
| 2,114,442 | 8/1938 | Fitzgerald | 277/235 B X |
| 2,781,820 | 2/1957 | Rogers | 156/292 X |
| 3,523,050 | 8/1970 | Campbell | 156/289 |

FOREIGN PATENTS OR APPLICATIONS 527,708  4/1954  Belgium..................................156/292

Primary Examiner—Benjamin A. Borchelt
Assistant Examiner—Daniel Bent
Attorney—Mann, Brown, McWilliams & Bradway

[57] ABSTRACT

A method of securing top and bottom members to intermediate plate structures by providing spaced apertures in the plate, positioning members on either side of the plate at least one of which is provided with mating portions such that the mating portions are within the spaced apertures in engaging relationship with the other member and providing an adhesive on at least those portions of the members in mating engagement to thereby form a unitary structure of somewhat rigid stability. The products formed by the disclosed methods will find application for use in conjunction with carburetor assemblies wherein the plate structure is metal so as to act, for example, as a heat dissipator between the carburetor manifold and carburetor throttle body. The method may be used in many other types of assemblies wherein the assembly of three parts is difficult to accomplish at high speed with complete reliability.

11 Claims, 9 Drawing Figures

INVENTOR
ROBERT G. FARNAM

BY
Mann, Brown, McWilliams & Bradway
ATTORNEYS

INVENTOR
ROBERT G. FARNAM

BY
Mann, Brown, McWilliams & Bradway
ATTORNEYS

METHOD FOR ATTACHING GASKET AND/OR INSULATOR MEMBERS TO PLATE STRUCTURES

BACKGROUND OF THE INVENTION

This invention in a broad sense is directed to a method of attaching top and bottom members to an intermediate structure without having continuous areas of securement between the assemblage and to products formed thereby.

The invention in its most limited form pertains to heat dissipator assemblies used in carburetor constructions. With today's sophisticated engines, and especially the sensitive and complicated carburetor mechanisms used therewith, it is necessary to protect against undue heat build up. Additionally, because of the extended use of sound deadening insulation surrounding the engine compartment, it has become necessary to provide some means of heat dissipation at the sensitive carburetor area. The influx of air-conditioning equipment, power steering components and various other power driven accessories delimiting the volume of the engine compartment within which the ambient atmosphere may circulate, has also complicated matters. In order to make the most efficient use of today's motor fuels, and to decrease the possibility of undesirable carburetion, and hence, to increase engine performance, it has been found necessary to insulate certain parts of and to provide heat-conductive assemblies for carburetor structures. Thus, one of the important objects of this invention is to provide a means of securing gasket and/or heat insulative members to a plate structure for use in automobile engines. The products formed by these methods will find their primary use and application in conjunction with carburetors of internal combustion engines.

The prior art, as far as known, has recognized the necessity of having heat sink or heat dissipation members for use in the vital carburetion area. For the most part, however, the proposals have involved elaborate plate structures which have been independently mounted between the carburetor manifold and carburetor throttle body, necessitating separate and independent insulative and/or gasket members for use in conjunction therewith, thereby making assembly fairly difficult because of the number of separate components. In other instances, in order to overcome the difficulties in handling and servicing three-piece components such as described, the prior art has suggested other methods of securing the various components together, all of which in comparison are found to be detrimental to the end result desired in that these methods necessarily entail costly fabricating steps or do not ensure that the component parts remain in unitary form. Thus, it is one of the objects of this invention to overcome these shortcomings and to provide, in an exemplary embodiment, a heat shield having an insulative body mounted on one side with or without a gasket and a gasket member mounted on the other side, all being handleable as a one-piece or unitary-like structure.

SUMMARY OF THE INVENTION

Basically, in an illustrative embodiment, the invention pertains to a method of securing a plate between two adjacent members to form a sandwich. The steps of the method involve cutting the plate to the desired configuration and providing a plurality of spaced apertures therethrough. The broadest concept contemplates providing members adjacent each side of the plate at least coextensive with the plate apertures where at least one of the members is deformable. The deformable member is deformed at the aperture areas and put into mating engagement with the other member. An adhesive bond is provided at least at the mating engagement area to form a unitary-like member. In another embodiment, the adjacent members are cut to the desired configuration with each having tab portions adapted to engage in mating relationship, the tab portions of an adjacently positioned member within the spaced apertures, and to that end the tabs are of congruent, but slightly smaller, configuration so as to be positioned within the apertures. An adhesive is, in one form, provided on at least the tab portions of each of the members which are in mating relationship within the apertures, and a member is positioned in aligned relationship on each side of the plate and the mating tabs put into pressure engagement or contact and thereafter the adhesive is allowed to take a set. In one embodiment, a heat-sensitive adhesive layer is provided as a dry film on, for instance, the tab surface. Subjection of the assemblage to heat, e.g., 180°–200° F., while in an assembly jig, causes the adhesive to become tacky and the application of pressure during this time permits adherence between mating parts and thereafter the adhesive in the assemblage is allowed to cure or set as by air curing in an air circulating oven. The plate and members are then made available in sandwich form.

In a specific application, the product formed by the method described is a gasket and metal plate heat insulating and dissipating assembly for use in conjunction with carburetors wherein the metal plate has high thermal conductivity and is formed with a first annular passageway corresponding in size to the carburetor intake. A plurality of spaced apertures outwardly positioned from the annular passageway is also provided in the plate. A first member of heat insulative character is positioned adjacent the metal plate, and has a gasket-like configuration congruent to the exterior of the carburetor intake, and is formed with a plurality of integral tabs aligned with and preferably corresponding in number to the plurality of spaced apertures in the metal plate. A second member of sealing character is positioned adjacent the plate and opposite the first member of heat insulative character and is of identical configuration therewith while the tabs of the first and second members meet in mating engagement within the apertures. In order to provide securement of the first and second members with the metal plate therebetween, a layer of curable adhesive is provided on the surface of said first and second members at least at the area of mating engagement of the tabs. The assemblage with or without gasket material on the surfaces of the insulative member is, in one instance, positioned between a carburetor manifold and carburetor throttle body with the insulative member on top or adjacent to the throttle body. Thus, the metal plate shields the throttle body from the higher temperature carburetor manifold. A heat dissipator carburetor member of sandwich form is thereby provided which is unitary in character and easy to handle and manipulate.

DESCRIPTION OF THE PREFERRED EMBODIMENTS

Figure 1:
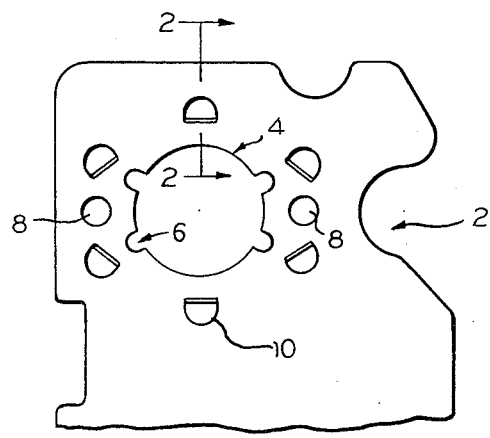
FIG. 1 illustrates in partial, plan view a metal plate for use in a specific application of the invention as in the form of a heat dissipator, insulator and gasket assemblage.
Figure 2:
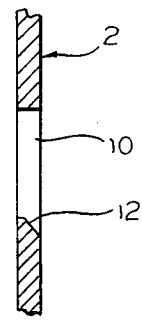
FIG. 2 is an enlarged, sectional view taken along the lines 2—2 of FIG. 1 to illustrate one form of an aperture in the heat shield.

Referring specifically to the drawings wherein like numerals designate like elements throughout, and specifically referring to FIG. 1, a plate member 2, in this case being of metal and having high thermal conductivity such as may be used in a carburetor assembly, is depicted. It will be noted that plate 2 has a configuration adapted to be positioned between, for instance, the carburetor manifold and carburetor throttle body or throttle body and bowl of the carburetor. Because of other engine apparatus within the carburetor area, the periphery of plate 2 is of irregular shape. Plate 2 is provided with annular passage 4 and is adapted to mount to inlet of the throttle body. While not necessary, but for alignment and other purposes, annular passage or aperture 4 is provided with elongated semi-circular-like slots such as 6. These slots may or may not be provided depending upon the particular carburetor in which the plate 2 is intended to be used. Holes 8 are provided so that the completed sandwich assembly hereinafter described may be suitably secured with the carburetor assemblage as by means of through bolts or the like. Outwardly positioned with respect to annular passageway 4 and in spaced relationship are a plurality of tab openings or apertures 10 each being of elongated semi-circular or half-moon configuration. The inward edge 12 of each of the apertures 10 is chamfered or beveled for reasons which will be later described. The number of laterally spaced apertures 10 should be sufficient so as to provide suitable points, around the circumference of annular passageway 4, to provide attachment locations as will be described. The metal shield or dissipator plate 2 may be of any material, but for present purposes, the description of the invention will be made as it specifically applies to an automobile carburetor assemblage. Hence, the materials of construction for the plate are contemplated to be of metal and specifically a high thermal-conductive metal so as to be able to act as a heat dissipator or the like. In some instances, aluminum will be the preferred metal with the total plate thickness, at the annular passageway, being about 0.0625 inch, but obviously the thickness may be within a broad range depending upon specific circumstances where the invention is practiced. Plate structures fabricated of several individual plates are also contemplated. Indeed the invention is not to be so narrowly construed that it only has application to the specific articles illustrated and described. For use in carburetors, however, the thickness and size of the metal plate should be sufficient to perform the intended purpose, and generally because it is of metal and other members of the assembly are not, it will not have as great an affinity for adhesion between the other members of the assemblage as the other members have for each other.

In the preferred embodiments, and because of economic and other considerations, the metal plate need not be specially prepared following the method of the invention. Where desired, however, it may have its surfaces prepared as by degreasing, coating and the like, so that when it is intended that the other members of the sandwich be bonded directly to the metal plate, the metal plate may have a polymer coating applied thereto so as to be more receptive to adhesive securement with the other member or members of the sandwich. In some instances the surfaces of the plate may be polished and thus made reflective.

What is intended to be described is a method of sandwiching, in an illustrative embodiment, a metal plate between a heat insulative member with or without a gasket cover and another member taking the form of a gasket. Quite obviously, the requirement for the gasket on either side of the metal plate for use in the carburetor assemblage will be apparent to those skilled in the art, since it is desired to effect a fluid-tight seal between, for instance, the throttle body and the carburetor manifold. So as to prevent undue heat transmission and/or radiation to the sensitive throttle body area of the carburetor, a heat insulator is provided.

Figure 3:
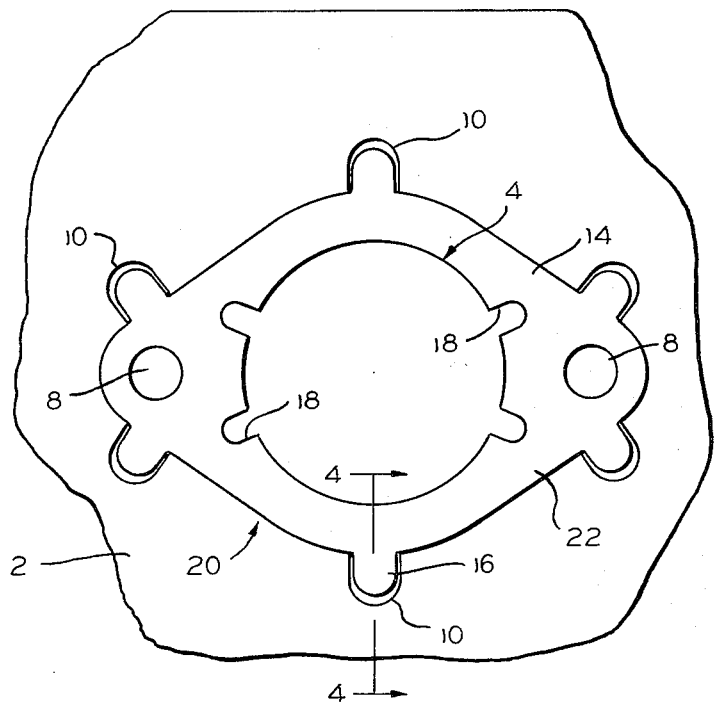
FIG. 3 is a fragmentary plan view of a typical heat dissipator, insulator and gasket assemblage.
Figure 4:
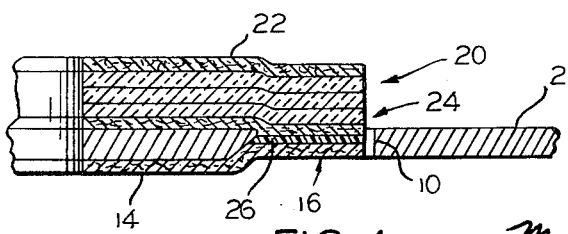
FIG. 4 is an enlarged, partial cross-section view taken along the lines 4—4 of FIG. 3 specifically showing the engaging surfaces of the tab portions of the members positioned adjacent the heat shield.

Referring now to FIGS. 3 and 4, just such an embodiment is illustrated. The member 14 is, in this instance, of gasket-like configuration and in fact, may be considered a gasket. It will be noted that its configuration follows the contour of at least the annular passage 4, and it has an outer peripheral configuration such that it encompasses the retaining bolt holes 8 of plate 2. Corresponding to and aligned with apertures 10 in plate 2 are projecting tab-like portions 16 of slightly smaller size than the aperture 10. The tabs are shorter in length and have a smaller radius at the corners as is apparent from the drawings. The number and congruency of tabs 16, with respect to apertures 10, are readily apparent. Depending upon the retaining means of the carburetor assemblage, the gasket 14 is also provided with retaining or receiving slots, or cutouts such as 18. Where preferred, the apertures 10 may be beveled or chamfered on each side so as to provide a countersunk-like area on each side of plate 2. The advantage of this feature being that the engaging surfaces of the adjacent members are positioned within the aperture, as will be later apparent.

Positioned adjacent one surface of plate 2 is heat insulative member 20, in this case, comprising a three-ply construction. Member 20 may be of a configuration different from that of gasket 14, but in the embodiment depicted is of identical size as gasket 14 with the exception, of course, of its thickness. The thickness of member 20 should be sufficient so as to insulate the sensitive throttle body of the carburetor from undesirably high temperatures. Secured to member 20 is gasket layer 22, in this instance, of the same construction and size as gasket 14. During the sandwiching operation, which will be later described, a high-pressing step is performed which causes that portion of member 20 adjacent the apertures 10 to be deformed thereinto as illustrated at 24. This in effect causes a tab-like projection or portion to be made and provided within aperture 10 whereby the tab 16, provided with a layer of adhesive 26, may be brought into engaging, mating and contacting relationship. Because of the chamfered and/or coined portion on the side of the plate 2 at each aperture 10, the formation of the projection as at 24 and the high pressure contacting of tab 16 therewith is facilitated. Additionally, the adhesive bond provided by adhesive layer 26 is positioned within the aperture 10 in a protective manner. The adhesive layer is preferably only provided at the tab engaging surfaces so that after extended use of the unitary assemblage in the field and when servicing or replacement of either one of the gaskets 14 or 22 becomes necessary, the metal plate 2 may be easily separated and stripped from the sandwich simply by inserting a thin knife blade or the like at the tab engaging points between the gasket 14 and member 20 to thereby break the adhesive bond. Because it is difficult to provide an adhesive only on the tabs of the members, an alternative is to entirely coat one or more members with an adhesive and then use a masking member to cover over all but the intended adhesive-coated tab. This will be later described.

Figure 5:
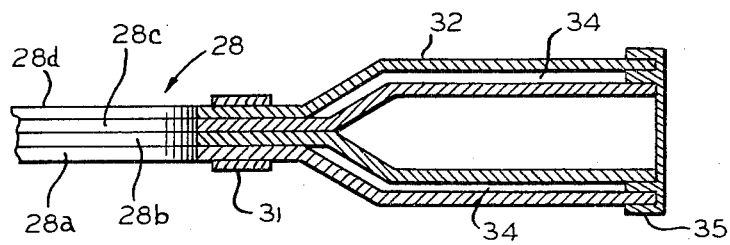
FIG. 5 is a side view in partial section of another embodiment of a heat shield structure for use in a carburetor assembly in accordance with the invention.

Referring now to FIG. 5, an alternate construction of the metal plate, at least at its extremities, is shown. In this instance, metal plate 28 is made up of four separate plates 28a, 28b, 28c, and 28d and spot welded, brazed or otherwise secured to one another at the annular carburetor passageway portion 30 of the plate structure as by means of U-clip 31. The plates are each given a wing-like bend such as 32, for instance, such that each of the plates are separated from each other by any suitable distance such as 34, this distance being dictated by volume and space availability in the carburetor area of the engine compartment. So that some rigidity of the structure is provided, frictionally engaging clip 35 may be used to insure spaced positioning of the thin plates and to decrease the likelihood of noise. The separation of the plates 28a, 28b, 28c and 28d obviously increases the heat dissipation character of the metal plate 28 acting as a heat exchange means allowing for greater surface contact with the ambient atmosphere under the hood of an automobile or the like.

Figure 6:
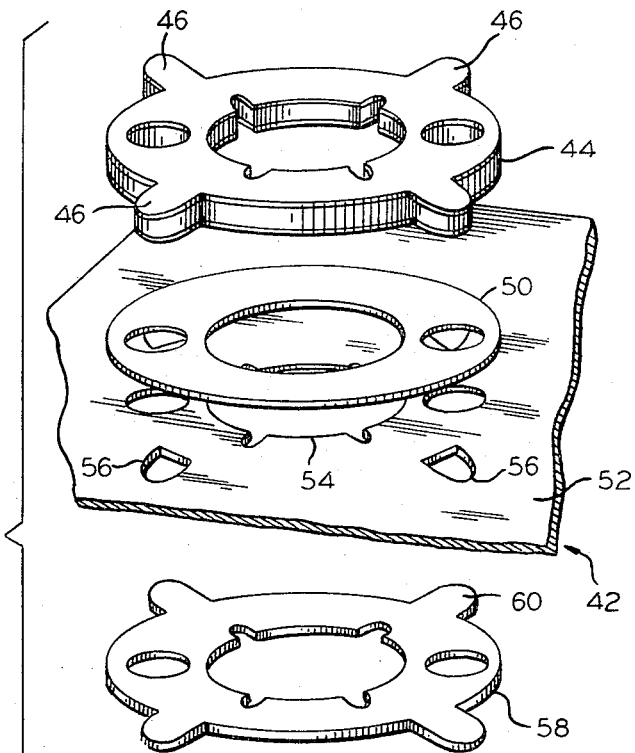
FIG. 6 is an exploded view of a preferred form of an exemplary embodiment of the invention.

Referring now to FIG. 6, there is schematically illustrated one form of the invention wherein the masking concept earlier alluded to is utilized. In this exemplary embodiment, the assemblage 42 employs top member 44 of sufficient thickness to perform the insulating function as earlier described, and, like the members earlier described, having an annular passageway and being provided with retaining bolt holes. It will be noted that top member 44 is provided with four ear-like portions, or tabs 46, and may be made of a single or unitary piece of material or of several layers or plies. Because it is easier to coat the entire undersurface 48 of top member 44 with an adhesive or the like, rather than just the undersurface of the tabs 46, masking member 50 is used. It will be noted that masking member 50 has essentially the same configuration as member 44 with the exception that it does not have portions corresponding to the tabs 46. The reasons for this will become apparent.

Plate 52 is provided with central annular passage 54 of congruent shape as top member 44, including congruent tab-receiving portions, such as 56. So as to form a fluid-tight seal in the carburetor assembly, in which the assemblage 42 is utilized, bottom member or gasket 58 is used. It will be noted that bottom member 58 is of identical configuration to member 44 with the exception of thickness. In sandwiching top member 44, plate 52 and bottom member 58 together, it will be apparent that the upper surface of tab 60 of bottom member 58 will mate with the adhesive-coated, exposed undersurface 48 of the tabs 46 of top member 44. Masking member 50 only allows the adhesive-coated tab surfaces to come into mating engagement with the upper exposed surfaces of tab 60. When brought together and subjected to heat and pressure, for instance, the adhesive effects a bond between the tabs of members 44 and 58, thereby producing a semi-rigid, unitary assemblage.

Figure 7:
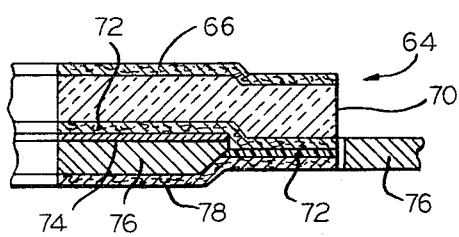
FIG. 7 is a greatly exaggerated view of a partial section of the embodiment of the invention depicted in FIG. 6.

FIG. 7 illustrates this embodiment of the invention, utilizing the masking concept. Top member 64 in this instance is first provided with thin layers 66 and 68 of gasket material composed of a cured polymer, such as nitrile rubber reinforced with asbestos fibers and having a small percentage of vegetable fibers and of finely granulated cork to enhance the conformability of the nitrile rubber and to impart improved sealing characteristics to the resin-reinforced fiberboard 64, specifically the surfaces thereof. Adhered to layer 68 is top gasket 70, to which has been applied layer 72 of uncured polymer adhesive. Masking member 74 keeps the polymer adhesive layer 72 from contacting metal plate 76, but permits bottom gasket 78, and specifically the tabs thereof, to contact the polymer coated tabs of top gasket 70 within the chamfered apertures of plate 76. The depressed or projection-like configuration given to members 70 and 78 within the aperture is due to the coining or pressing step of the method of formation, which will be later described. Bottom gasket 78 may be of the same material as cover layer 66 of insulator 64. It should be obvious that the adhesive destined to form the bond for the assemblage could be applied to the element 78 and the masking member used in conjunction therewith in reverse fashion to that described above, and still remain within the herein disclosed inventive concept.

Figure 8:
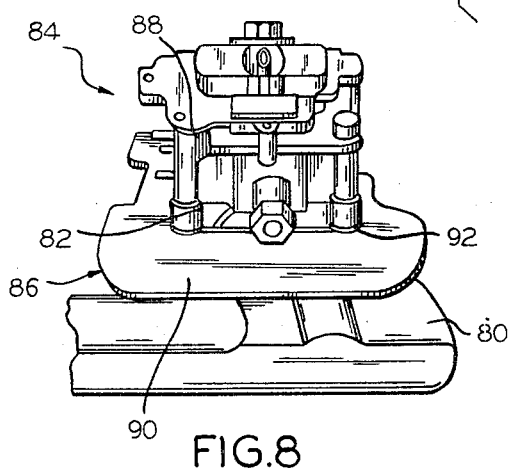
FIG. 8 is a schematic view showing the field of use of an exemplary embodiment of the invention.

Although the invention has applicability other than the specific illustrations given, the specific field of use where the invention has first been successfully practiced is that already described, i.e., carburetor assemblies. FIG. 8 schematically illustrates such an application. The manifold 80 is a source of immense heat and in order to prevent the transmission and/or radiation of that heat to the throttle body 82 of carburetor assembly 84, a heat shield, dissipator or heat sink assembly 86, fabricated in accordance with this invention, is used. It will be noted that the carburetor bowl 88 of carburetor assembly 84 is protected by the heat shield or plate 90 of the sandwiched component 86. The gasket on the underside of the assemblage 86 is not seen, but the top member 92 clearly demonstrates how the heat shields of this invention are used. The insulator member 92 cuts down on the amount of heat that is transmitted from the manifold 80 to the carburetor bowl 88. The metal plate 90 inhibits radiant heat from finding its way to the critical carburetor bowl 88 area. The plate 90 is seen to be of irregular shape in order to be compatible with the other components and with the internal combustion engine with which it is used.

The specifics of the components and methods of forming the illustrative embodiments of the invention will now be discussed, but it should be understood that this commentary is merely to lend a better understanding of the invention since other materials, specific assemblies and field of use are contemplated.

THE TOP OR INSULATOR MEMBER

Because it is highly desirable to provide sufficient insulation between the particular carburetor components of the assemblage, wherein the specific heat shield embodiment of the invention is used, the thickness of the insulative member will be dictated by the space requirements as well as the developed ambient temperatures within the engine compartment. Generally speaking, the insulative member may be made up of one or more layers depending upon space and other requirements and the form in which the insulative materials are commercially available. The materials of construction for the insulative member may be any of those presently regarded in the art as meeting the requirements aforedefined. Materials contemplated include the well-known synthetic materials but because of economic factors, it has been found that a resin-reinforced fiberboard is both practical and economical. Generally speaking, the thickness that the insulative member may take will vary depending again on the specific application of the assemblage or sandwich. Generally, however, in the specific embodiment disclosed, the fiberboard core will be about 0.125 to 0.200 inch in thickness with the acceptable range being about 0.180 inch. Other materials are also contemplated.

THE PLATE

As indicated earlier, the invention may be thought of as a method of securing two members to a plate structure. The plate structure generally will be metallic in nature, although other materials are also contemplated. Where the metal plate is to be sandwiched between two members and adhesively secured only at the tab portions, it need not have any special treatment, but in some cases where it is anticipated that one or both members will be bonded directly to the plate, as by an adhesive, then the plate should be subjected to preliminary treatment. This preparation or cleaning of the metal surfaces is necessary in order to remove oxides, scale or other foreign matter which may interfere with the formation of a satisfactory adhesive bond. Chemical treatment of the metal surfaces or simple preparation such as degreasing may suffice. The types of metal, where it is contemplated that the structure may be used in a heat shield environment, may be any of those that are of high thermal conductivity in nature and meeting the prerequisites previously described. The metal stock may be in the sheet form or in roll stock form and may have one or both of its surfaces prepared so as to make them receptive to an adhesive bond using such preparation agents, cleaners, degreasers as may be necessary and including such materials as mono-ammonium-phosphate, perchloro-ethylene and various other chemicals familiar to those in the metal-cleaning art. Because it is necessary to have a thoroughly clean and prepared receptive surface, the metal is preferably coated immediately after the metal-cleaning step with the material which will make the metal plate surface or surfaces receptive to the formation of an adhesive bond. The particular nature of this coating will be discussed in more detail hereinafter following.

THE BOTTOM, GASKET AND MASKING MEMBERS

In general, the materials contemplated by this invention for use in the specific embodiment disclosed viz., carburetor heat shield, are those gasket materials commonly used in the gasket art because these materials have proven themselves in service to be able to withstand the rigors of service conditions found in engine compartments and more specifically carburetor assemblies. Typical of such gasket materials are those made in accord with the teachings of Kao, U.S. Pat. No. 2,676,099 granted Apr. 20, 1954. A satisfactory type of gasket material has been found to be one using a mineral fiber, such as asbestos fiber, in combination with an elastomer such as nitrile rubber. Such material is available from the F. D. Farnam Co. under the trade name "Kaobestos."

The sheet packing material used for the gaskets and masking members of the specific assemblage described and illustrated may be within the range of 0.015–0.025 inch thick, with the preferred thickness being about 0.020 inch. Obviously, depending upon specific applications, these thicknesses may vary.

For some applications of the invention, other gasket materials, elastomers and the like may be used as disclosed in the U.S. Pat. to Farnam et al. No. 3,158,626. Other materials for other applications are also contemplated.

THE ADHESIVE

While in the preferred form, adhesive is intended only to be applied on the tab-like projections for mating engagement portions of the members of the assemblage, it is contemplated, and within the scope of the invention, that the adhesive be provided either on the plate per se, after it has been specifically treated to be receptive to such adhesive, or that the adhesive be applied to the entire surface portions, in the specific case, of either or both of the gasket and/or heat insulative members coming in contact with the plate sandwiched therebetween. In such case a masking member will be used. Also the adhesive may be, where practical, only applied to surfaces of the tabs intended to meet in contacting engagement. The adhesive and/or elastomeric resin composition which has been found to be particularly suitable, is a curable neoprene and phenolic resin emulsion. Other adhesives which will withstand the heat and pressure and the environment in which the assemblage is to be used will also be satisfactory.

The neoprenes have been found to be capable of forming effective bonds as far as rubber-type cements are concerned. The addition of phenolic resins to some of these cement formulations have also illustrated marked cohesive strength and grip adhesion for various fibers and particularly metals where it is contemplated that the plate structure is of a metallic material. The particular types of neoprene and phenolic resins contemplated are those which are generally thermal setting at a temperature of about 325°–400° F. The adhesive will generally be applied to either the cleaned metal stock, the metal plate structure contemplated and/or the gasket and/or insulative member in as thin a layer as possible. It is preferred that the adhesive layer bond between the plate and/or insulative and/or gasket layer be only that thickness necessary to form an adhesive bond between the respective mating or engaging surfaces and no more. Where applied, the thickness of the elastomer-resin layer will be about 0.002–0.003 inch thick on the metal and about 0.0005–0.0007 inch thick on the gasket and/or heat insulative member. Where the gasket material is available in web form and the heat insulative material is available in sheet form, the adhesive composition should be applied and then either dried or partially cured so that the gasket and/or heat insulative sheet board material may be easily handled during die cutting and like operations.

There are a number of elastomer-resin compositions available, each of which have specific advantages. It is only important that the elastomer-resin be capable of being applied as a continuous thin layer and that it be such that it can be dried or partially cured for easy handling prior to the final assembling of the structures of this invention, and that it also be capable upon final or ultimate curing of producing an adhesive bond between sandwiched plate where desired, and at least between the mating engaging surfaces of the heat insulative materials on the one side of the plate and the gasket layer material on the other side, within the apertures provided in the plate for that purpose. The types of elastomer-resin compositions found highly desirable are as disclosed in Farnam et al. U.S. Pat. No. 3,158,626.

METHODS OF FORMING

Generally speaking, the individual gaskets are die cut as are the plate structures and the heat insulative members. The means of accomplishing this are no different than those ordinarily employed in the gasket manufacturing art or the metal stamping art for that matter, where the plate structures contemplated are of metal.

Generally, in the case where it is desired to form an adhesive bond between the plate structure surface and adjacent members, the plate structure will be subjected to the surface preparation treatments previously described so as to be receptive to the adhesive layer. The plates may be dried or partially cured for handleability and die cut to size with the proper apertures and passageways being provided depending on the end use to which the assemblages will be put. Likewise, the gasket material is die cut and in the embodiments described and illustrated, but not to be limited thereto, it will have a congruent and identical configuration to the heat insulative member described and illustrated for the heat shield embodiment of the invention. In some instances one surface of the gasket material will be provided with polymer adhesive, dried and then cut for further use. A gasket layer may also be provided on the surface of the heat insulative member opposite that surface engaging the plate surface. Masking members where used will also be die cut.

Figure 9:
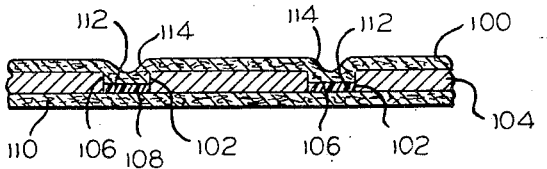
FIG. 9 is a cross-sectional view illustrating another embodiment of the invention.

The mode of fabrication may take a form similar to that illustrated and described in U.S. Pat. No. 3,438,836. In the method and the apparatus described therein, some modification to both method and apparatus for assembling the carburetor heat shield embodiments of the invention will be necessary. For instance, slight modifications to the die shapes and other modifications will at once be apparent to those of ordinary skill in the art. The only matter of import and perhaps requiring some small dissertation over the art, pertains to effecting the mating engagement, and adhesive bonding of the adjacent members of the plate assemblage within the apertures of the plate. Thus, where the tab-like projections come in mating contact, it is desirable to utilize sufficient pressures and to utilize the beveled or chamfered construction for the apertures, so that the tab projection or portions of the heat insulative member on the one side of the plate and the gasket member on the other side will meet in satisfactory engagement to form bond lines to permit the formation of the sandwiched unitary assembly. In some instances, coining or densifying or deforming under pressure of both the top and the bottom of the tabs will be desirable to obtain satisfactory engagement. More broadly, however, the tabs, projections or mating portion or portions of one or both members may be depressed during the sandwiching step. In this case, referring specifically to FIG. 9, the top or deformable member 100 is depressed at the apertures 102 of plate 104 to form depressions or mating portions 106 engaging the inside face or surface 108 of member 110 through adhesive bond 112. Note that corresponding dimples or depressions 114 are formed opposite depressions 106. Member 110 need not be flexible or deformable in this instance and the mode of providing the adhesive to form the adhesive bond may take any already described. Obviously the masking member concept may also be employed.

Thus, an effective means of bonding three members together in unitary fashion, wherein the sandwiched or middle member has a lesser affinity for adhesion between either one of the members than the two members themselves, has been described. While specific to a heat shield structure for use in carburetor assemblies, the method and articles produced will have applications other than these and the scope of the invention is not to be limited, except as provided in the appended claims.

The embodiments of this invention in which an exclusive property or privilege is claimed are defined as follows:

1. The method of forming a unitary sandwich structure of three sheet-like members in which the intermediate member is a sheet metal plate, and at least one of the outer members is made of a flexible deformable material, and in which a firmer adhesive bond can be made with a given adhesive between the two outer members than between an outer member and the intermediate plate member, said method comprising forming spaced apertures in said metal plate at a plurality of points where said outer members extend on both sides thereof, providing at least one tab on said deformable outer member at one of said points, with such tab being deformable through the corresponding aperture into engagement with the other outer member, providing said given adhesive on the interior face of at least one of said outer members in the area of said one point, and deforming said tab into adhering engagement with the other outer member through said corresponding aperture.

2. The method in accordance with claim 1 wherein a plurality of adhesive spots corresponding to said apertures are applied on said flexible, deformable material.

3. The method in accordance with claim 1 wherein an adhesive layer is formed on the entire interior face of said flexible, deformable material member and a masking member is positioned between said member and said plate to prevent adhesion with said metal plate but allows for adhesion between outer members within said apertures.

4. The method of securing a plate between two adjacent deformable members to thereby form a sandwich comprising: cutting said plate to the desired configuration and providing a plurality of spaced apertures therethrough; cutting each of said adjacent members to the desired configuration with each having at least one protuberance or tab adapted to engage in mating relationship the protuberance or tab of the other member within at least one of said spaced apertures, said protuberances or tabs being of congruent configuration to said aperture, providing an adhesive between the protuberances or tabs of each of said members adapted to meet in mating relationship within at least one of said apertures of said plate, positioning said members in aligned relationship on each side of said plate, pressure contacting and deforming said protuberances or tabs through at least one of said spaced apertures, allowing said adhesive to set; and recovering said plate and members in sandwich form.

5. The method in accordance with claim 4, wherein the affinity for adhesion between mating surfaces of said members is greater than that between the surface of each of said members, and said plate and the number of tabs and apertures are sufficient to provide a quasi-unitary sandwich structure.

6. The method in accordance with claim 5 wherein said plate is planar and of metal of high thermal conductivity and said adjacent members are sheet-like and at least one of said members provides a heat insulative layer.

7. The method in accordance with claim 6 wherein the other of said members is of gasket character adapted to effect a seal in the assemblage wherein said sandwich is used.

8. The method in accordance with claim 7 which additionally includes the step of chamfering the edge of said apertures so as to facilitate said mating engagement of said protuberances or tabs.

9. The method in accordance with claim 8 wherein said adhesive is a curable polymer and the sandwich in its assembled form is subjected to a curing step.

10. The method in accordance with claim 9 wherein an adhesive layer is provided, on the interior surface of at least one of said adjacent members and a masking member is interposed between said plate and said interior surface to thereby mask said plate from said adhesive layer and only provide said adhesive for bonding within said apertures.

11. The method in accordance with claim 10 wherein said masking member is of gasket character and said apertures are slightly larger than said tabs.

* * * * *